J. W. RHYNE.
DRILL CHUCK.
APPLICATION FILED OCT. 19, 1907.

949,439.

Patented Feb. 15, 1910.

Witnesses
J. C. Simpson
H. G. Smith

Inventor
Jesse W. Rhyne.
by Chandler & Chandler
Attorneys

UNITED STATES PATENT OFFICE.

JESSE W. RHYNE, OF SPEAR, NORTH CAROLINA.

DRILL-CHUCK.

949,439.   Specification of Letters Patent.   Patented Feb. 15, 1910.

Application filed October 19, 1907. Serial No. 398,246.

*To all whom it may concern:*

Be it known that I, JESSE W. RHYNE, a citizen of the United States, residing at Spear, in the county of Mitchell, State of North Carolina, have invented certain new and useful Improvements in Drill-Chucks; and I do hereby declare the following to be a full, clear, and exact description of the invention, such as will enable others skilled in the art to which it appertains to make and use the same.

This invention relates to drill chucks and more particularly to a chuck embodying means whereby the drill bit may be inserted in the chuck and automatically caught therein and held without the necessity of employing the usual bolts and nuts. It is well known to those skilled in the art that in the present forms of chucks wherein bolts and nuts are employed it is necessary to stop the operation of the drill and tighten the nuts. Not only does this take up time but constant tightening and loosening of the nuts and bolts result in their threads becoming worn to such an extent that they soon have to be replaced.

The device when employed in connection with the chuck for the purpose above described is in the form of a spring pressed latch which has a hooked end for engagement in a notch formed in the shank end of the bit.

Figure 1:
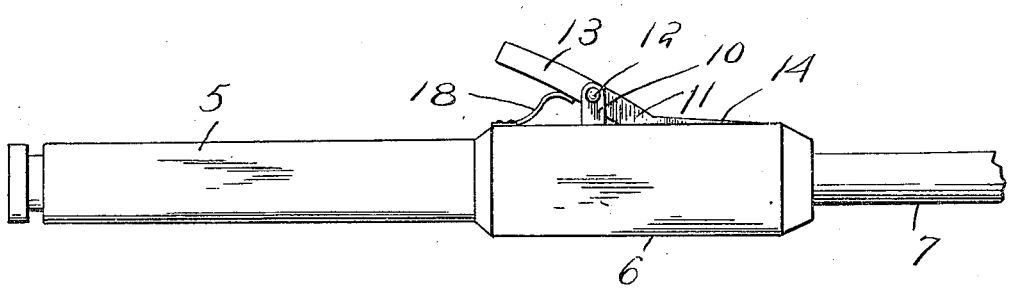
Figure 2:
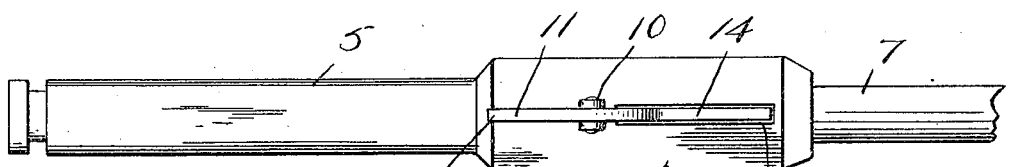
Figure 3:
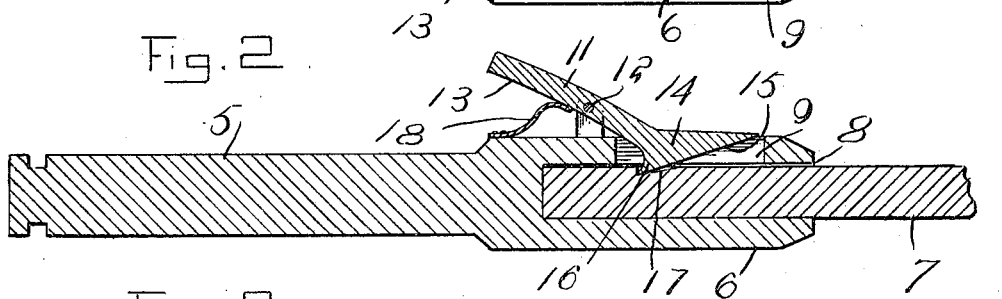
Figure 4:
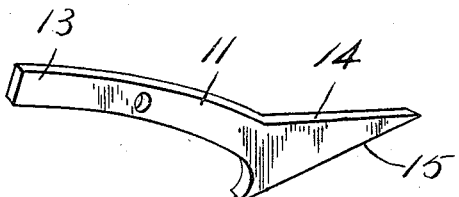

In the accompanying drawings, Figure 1 is a side elevation of a drill piston, chuck, and bit showing the application of the principle of the invention, Fig. 2 is a top plan view, Fig. 3 is a vertical longitudinal sectional view, and, Fig. 4 is a detail perspective view of the latch detached from the chuck.

In the drawings there is illustrated a portion of a drill piston, indicated by the numeral 5, having a chuck head or end 6, and there is also illustrated a drill bit 7. The drill bit 7 is inserted in the usual bore or socket 8 in the chuck 6 and formed through one side of the chuck and communicating with the bore is a slot 9. A pair of spaced ears 10 are formed upon the chuck rearwardly of this slot 9 and in alinement therewith and between these ears is pivoted a latch 11 the pivot for the latch being indicated by the numeral 12. This latch includes a stem or finger portion 13 and a head 14 which has one of its edges beveled as at 15, this said edge, rearwardly of the beveled portion, being cut away to form a hooked shoulder 16. The said head 14 of the latch seats in the slot 9 in the chuck and the hooked shoulder 16 engages in a notch 17 formed in the drill bit 7, there being a spring 18 located between the chuck and the stem or finger portion 13 of the latch in order to normally hold the shoulder 16 in such engagement.

From the foregoing description of my invention it will be observed that I have provided a device of this class which is simple in construction and which will at the same time be secure and will firmly hold the drill bit in the chuck. Furthermore it will be noted that the latch shoulder is substantially of hook formation and consequently a more secure purchase is had upon the bit.

What is claimed, is—

The combination with a drill receiving socket provided with a lateral slot extending longitudinally therethrough; a pair of outwardly projecting spaced ears, a drill engaging member pivoted to said ears intermediate its ends and having a hook provided with a point, the hook normally projecting through the slot into the socket with its point directed inwardly and rearwardly of the socket, and a spring for normally retaining the hook in position in the socket.

In testimony whereof, I affix my signature, in presence of two witnesses.

JESSE W. RHYNE.

Witnesses:
R. M. BURLESON,
W. C. FRANKLIN.